Jan. 26, 1965   D. GOLDSTEIN   3,167,179
MERCHANDISING AND SHIPPING DEVICE
Filed Sept. 29, 1960   9 Sheets-Sheet 1
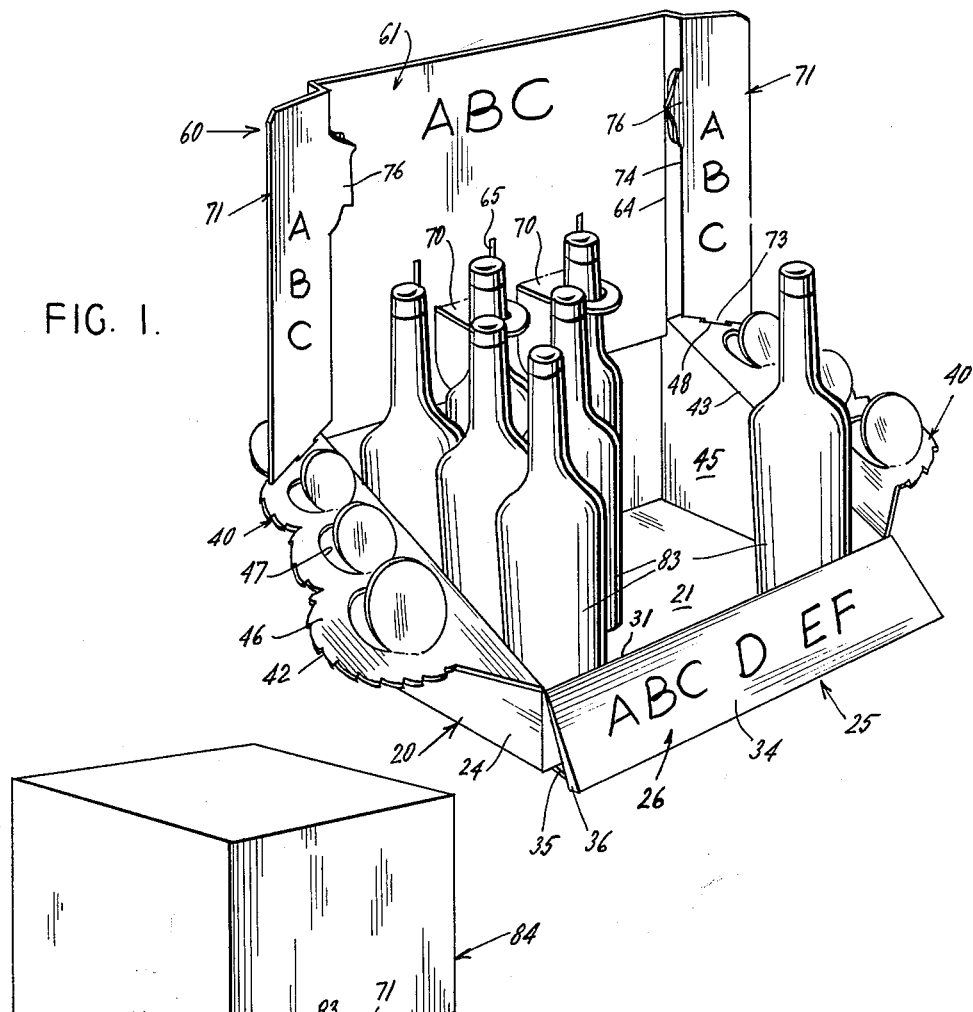
FIG. 1.
FIG. 2.
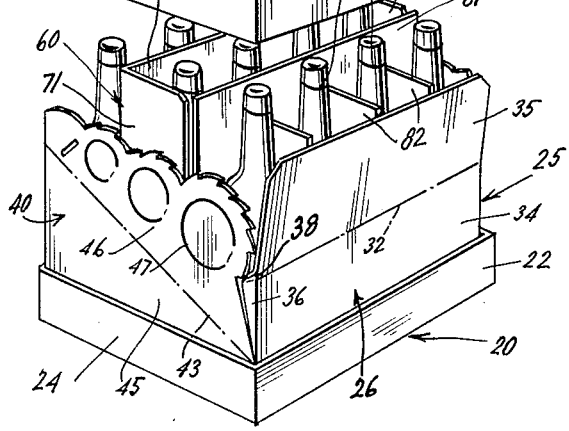
INVENTOR.
DANIEL GOLDSTEIN
BY
Blum, Moscovitz, Friedman & Blum
ATTORNEYS

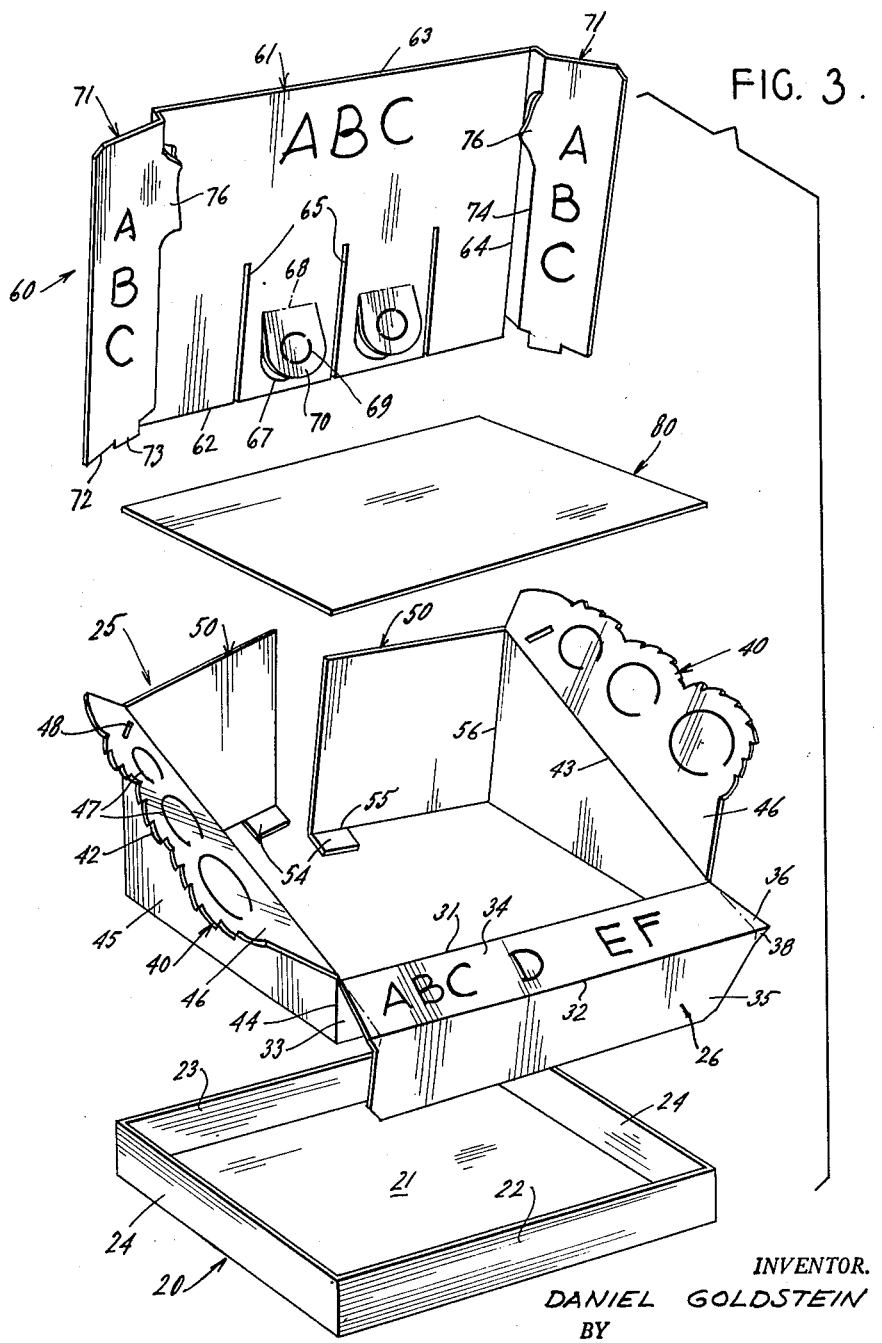

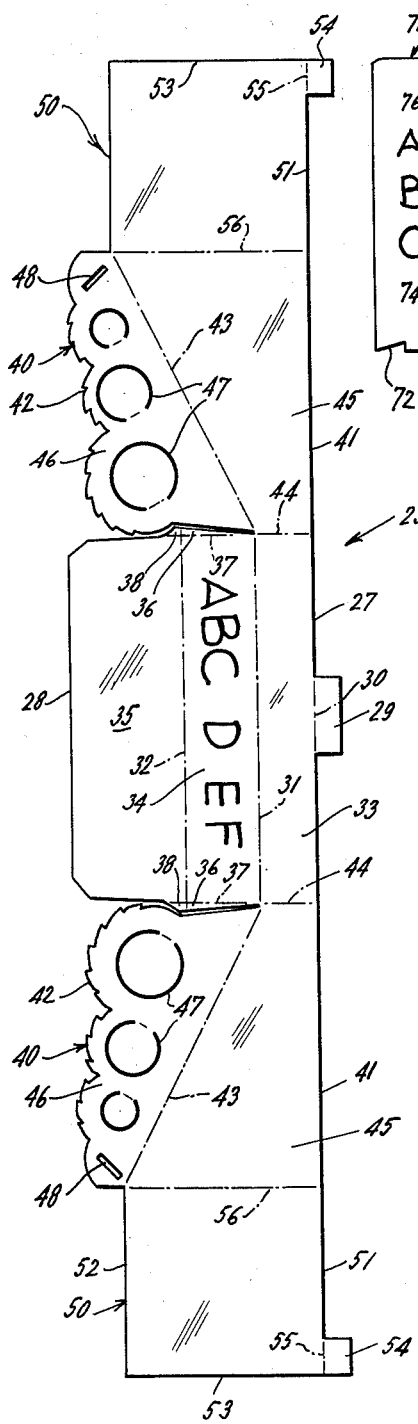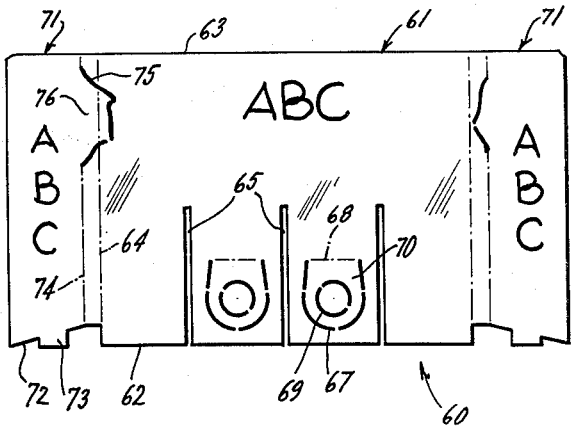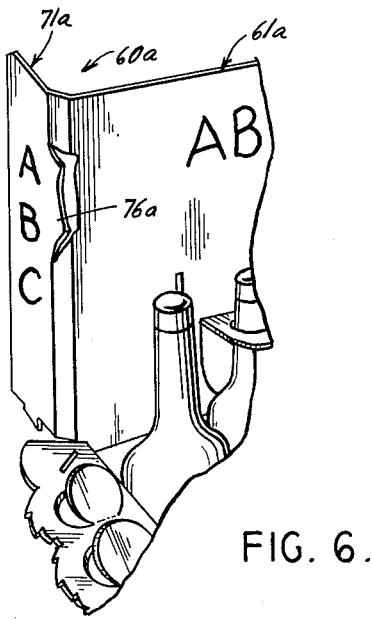

Jan. 26, 1965

D. GOLDSTEIN 3,167,179

MERCHANDISING AND SHIPPING DEVICE

Filed Sept. 29, 1960

INVENTOR.
DANIEL GOLDSTEIN
BY
Blum, Moscovitz, Friedman & Blum
ATTORNEYS

Jan. 26, 1965 D. GOLDSTEIN 3,167,179
MERCHANDISING AND SHIPPING DEVICE
Filed Sept. 29, 1960 9 Sheets-Sheet 5
FIG. 10.
FIG. 11.
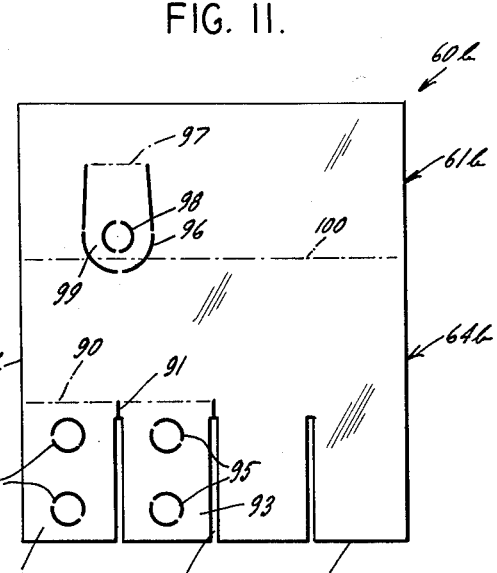
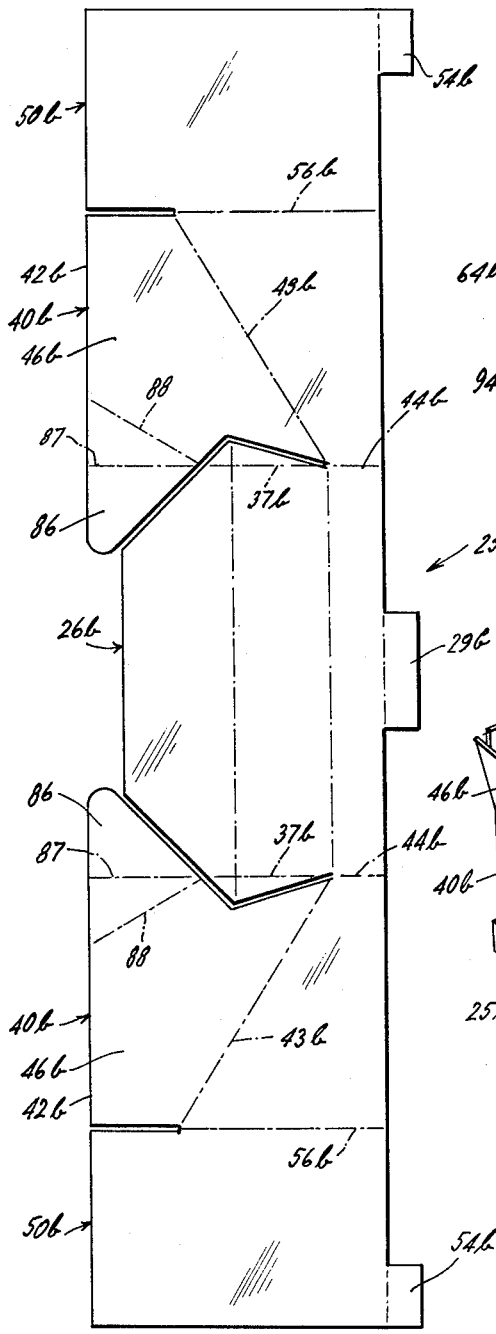
FIG. 9.
INVENTOR.
DANIEL GOLDSTEIN
BY
Blum, Moscovitz, Friedman & Blum
ATTORNEYS Jan. 26, 1965   D. GOLDSTEIN   3,167,179
MERCHANDISING AND SHIPPING DEVICE
Filed Sept. 29, 1960   9 Sheets-Sheet 6

Jan. 26, 1965   D. GOLDSTEIN   3,167,179
MERCHANDISING AND SHIPPING DEVICE
Filed Sept. 29, 1960   9 Sheets-Sheet 7

INVENTOR.
DANIEL GOLDSTEIN
BY
Blum, Moscovitz, Friedman & Blum
ATTORNEYS

Jan. 26, 1965 D. GOLDSTEIN 3,167,179
MERCHANDISING AND SHIPPING DEVICE
Filed Sept. 29, 1960 9 Sheets-Sheet 8

INVENTOR.
DANIEL GOLDSTEIN
BY
Blum, Moscovitz, Friedman & Blum
ATTORNEYS

Jan. 26, 1965   D. GOLDSTEIN   3,167,179
MERCHANDISING AND SHIPPING DEVICE
Filed Sept. 29, 1960   9 Sheets-Sheet 9
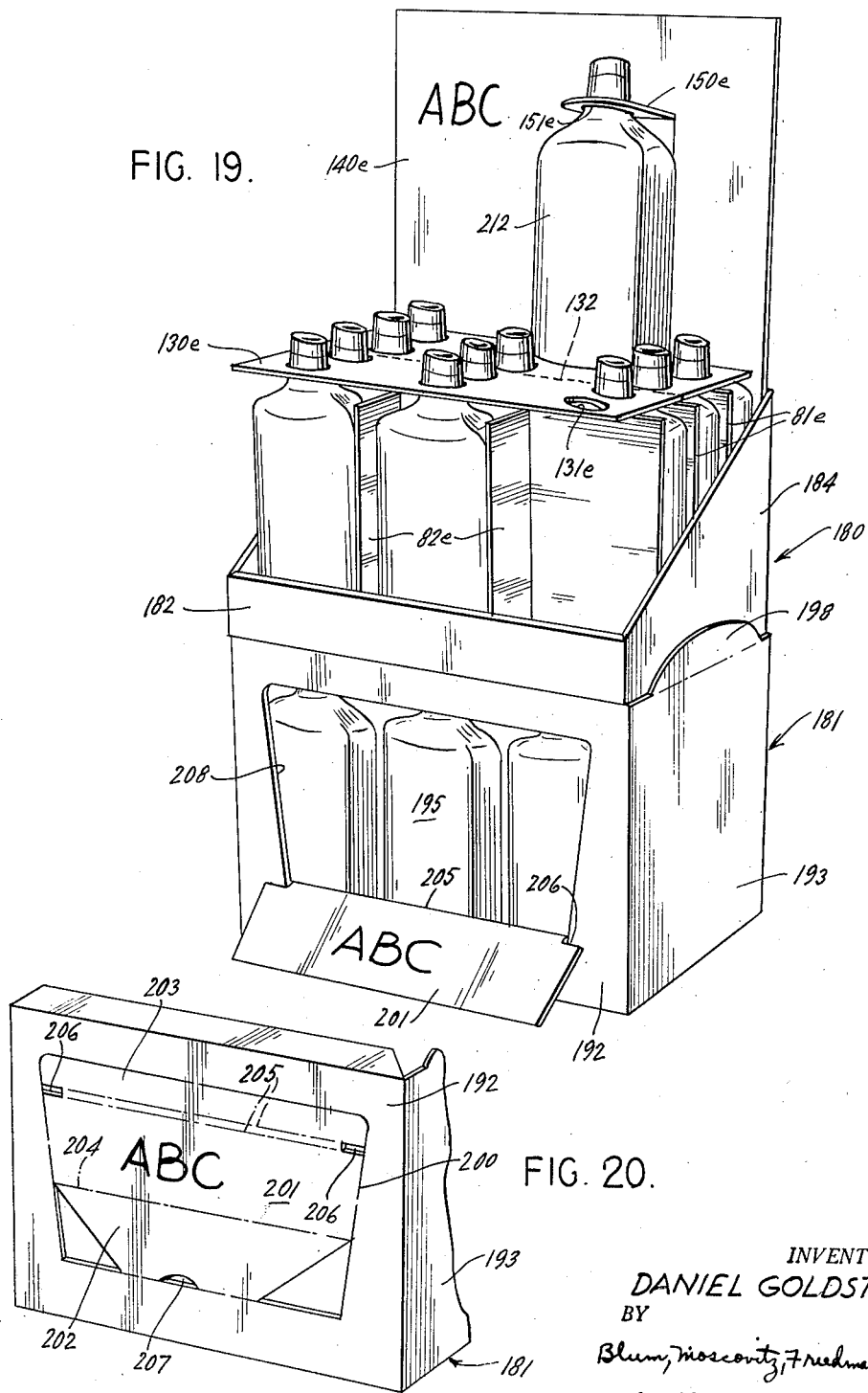
INVENTOR.
DANIEL GOLDSTEIN
BY
Blum, Moscovitz, Friedman & Blum
ATTORNEYS

United States Patent Office 3,167,179
Patented Jan. 26, 1965

3,167,179
MERCHANDISING AND SHIPPING DEVICE
Daniel Goldstein, New York, N.Y., assignor to Schenley Industries, Inc., New York, N.Y., a corporation of Delaware
Filed Sept. 29, 1960, Ser. No. 59,210
12 Claims. (Cl. 206—44)

This invention relates generally to devices for shipping, advertising, promoting, and merchandising goods, and also contemplates a novel method of handling goods to advertise, promote and merchandise the same.

As is well known to those versed in merchandising of goods, manufacturers commonly go to great trouble and expense to distribute point-of-purchase displays for use in conjunction with their goods. However, these displays have, in the past, required the following complicated printed instructions and involved considerable time, skill, dexterity and effort on the part of the retailer, so as to frequently be discarded without use at all, causing a substantial loss to the manufacturer. Also, it was common in the past to distribute such displays separately from the goods, which added to the expense of distributing the display materials, and wherein the display materials performed no useful function in transit.

It is, therefore, one object of the present invention to provide a unique, completely self-contained merchandising and shipping container, and method of handling or treating merchandise in distribution, which overcome the above-mentioned disadvantages, incorporate display material as part of a shipping container for shipment simultaneously with the goods and service in protecting the goods during transit.

It is another object of the present invention to provide a merchandise-distribution method and structure therefor which are so simple as to require little or no instruction, the formation of a display being apparent upon opening of the shipping container.

Viewed otherwise, the instant invention contemplates the provision of a shipping container which is capable of transformation into an attractive and effective display of the contained goods without detailed instructions, the display being substantially fully erected upon mere opening of the container, except for minor readily apparent and quickly accomplished manipulation.

In addition to the above, it is a further object of the present invention to provide a highly advantageous merchandising and shipping container wherein the goods shipped in the container remain in the container at the point of ultimate sale and the latter is capable of quick, simple and effective transformation into a display from which the goods may be actually dispensed for retail sale, and which sales display is effectively theftproof or self-service, or a combination thereof throughout the entire period required for retail sale of the contained goods.

Still another object of the present invention resides in the provision of novel means whereby portions or parts of the instant combination shipping and merchandising device are readily removable as packages of the goods are sold, so that the device always presents a full and complete appearance, and most advantageously presents the contained goods to view throughout the entire period of retail sales of the contained goods.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:
FIG. 1 is a front perspective view showing a merchandising and shipping device of the present invention in its display condition;

FIG. 2 is a perspective view showing the device of FIG. 1 in its shipping condition but with the cover removed for clarity of understanding;

FIG. 3 is an exploded perspective view showing certain elements of the device of FIGS. 1 and 2;

FIG. 4 is a plan view showing the blank of a liner for the device of FIGS. 1–3;

FIG. 5 is a plan view of a blank for a divider of the device of FIGS. 1–3.

FIG. 6 is a partial perspective view showing a slightly modified form of display;

FIG. 9 is a top perspective view showing the device of FIG. 7 in condition for transit with the cover removed;

FIG. 10 is a plan view showing the liner of FIG. 8 before being folded into the receptacle-lining condition;

FIG. 11 is a plan view showing a blank for use as a divider in the embodiment of FIGS. 7–10;

FIG. 19 is a front perspective view showing the assembly of FIG. 18 in its display-selling condition; and FIG. 20 is a partial front elevational view showing in greater detail a structural feature of the embodiment of FIGS. 17–19.

Figure 7:
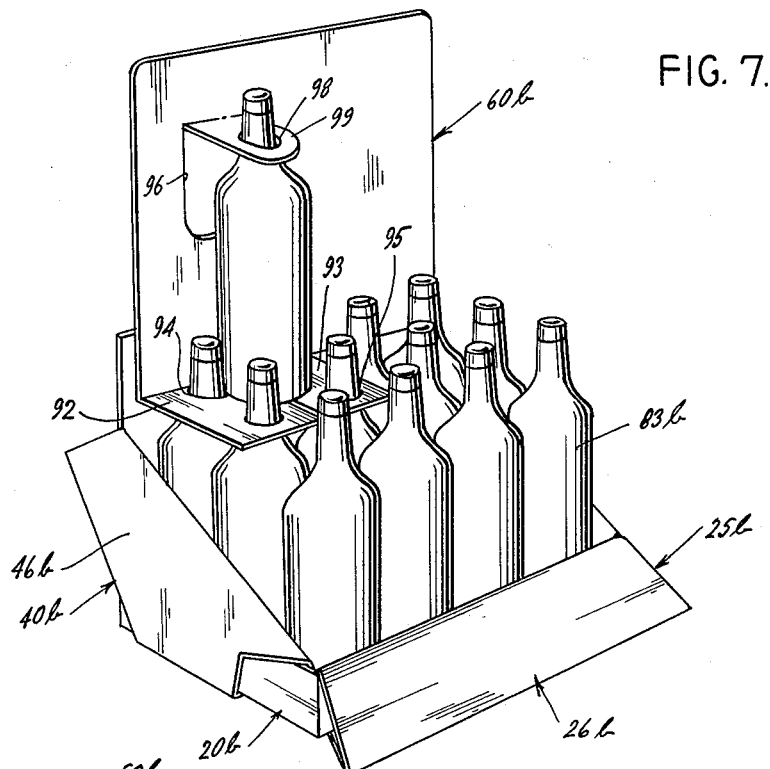
FIG. 7 is a front perspective view showing another slightly modified embodiment of the present invention.
Figure 8:
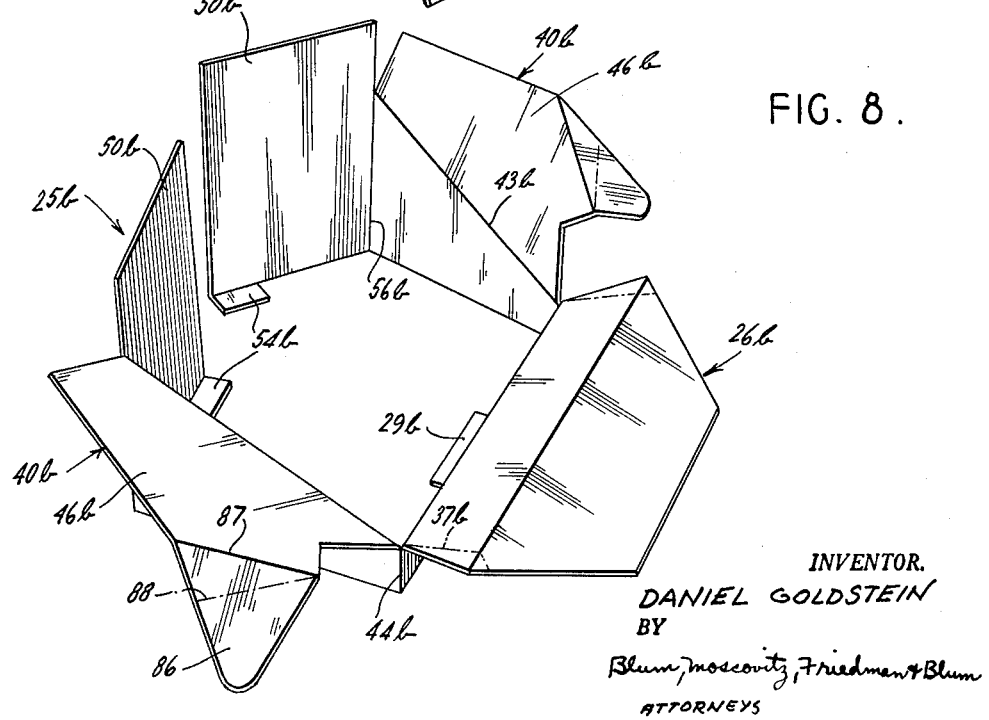
FIG. 8 is a perspective view showing a liner of the device of FIG. 7, apart therefrom.

Referring now more particularly to the drawings, and specifically to FIGS. 1–3 thereof, a receptacle is there generally designated 20, and shown for purposes of illustration and without limiting intent as being of generally rectangular configuration, including a generally rectangular bottom wall 21, generally rectangular front and rear walls 22 and 23 upstanding from the front and rear edges of the bottom wall, and a pair of laterally spaced side walls 24 upstanding from the side edges of the bottom wall and extending forwardly and rearwardly between the front and rear walls.

A liner is generally designated 25 and is seen in FIG. 4 as being of elongate, flat or coplanar configuration. The liner includes a generally rectangular central panel 26 having a pair of laterally extending, parallel lower and upper edges 27 and 28. Provided medially of the edge 27 is a tab or extension 29 hingedly connected to the central panel 26 by a fold line 30 in alignment with the edge 27. A pair of parallel spaced fold lines 31 and 32 are formed in the panel 26 extending in parallelism with and spaced between the edges 27 and 28. The central panel 26 is thus subdivided into three generally rectangular sections, section 33 between the edge 27 and fold line 31, section 34 between the fold lines 31 and 32, and section 35 between the fold line 32 and edge 28. If desired, relatively small, generally triangular tabs or extensions 36 may be connected to opposite ends of the section 34 by fold lines 37 extending generally normal to and between the fold lines 31 and 32. Also, additional tabs 38 may be provided on opposite ends of the section 35 proximate to the tabs 36, respectively. Section 34 is provided with advertising indicia, as will appear hereinafter.

On opposite sides of and extending from the central panel 26 are a pair of intermediate or side panels 40. The intermediate or side panels 40 may be or may not be substantially identical and are shown identical herein for simplicity. Each side panel 40 includes a lower edge 41 in end-to-end alignment with the adjacent end of edge 27 of the central panel 26, and a decoratively cut edge 42 spaced from the edge 41. The intermediate panels 40 are optionally roughly rectangular and each subdivided into a pair of generally trapezoidal sections by an oblique fold line 43. That is, each panel 42 is hingedly connected to the central panel 26 by a fold line 44 which extends from the juncture of aligned edges 27 and 41 to the adjacent end of fold line 31; and, the diagonal fold line 43 extends from the corner of intersection of fold line 31 and adjacent fold line 44 obliquely away from the adjacent edge 41. Thus, each panel 40 is subdivided into a generally trapezoidal section 45 hingedly connected along its shorter side to the adjacent end of section 33 and being of increasing size in the direction away from the section 33. An additional section 46 is defined between the edge 42 and the diagonal fold line 43 and may be provided with one or more interrupted cuts or scores for decorative or display purposes. Each of the sections 46 is of decreasing or convergent configuration in the direction away from central panel 26, and is provided in its remote region with a slot or cut 48.

Extending from the outer or remote side of each intermediate panel 40 is a distal or end panel 50. Each end panel 50 may optionally be of generally rectangular configuration, being bounded between a pair of parallel edges 51 and 52, and a distal or end edge 53 extending generally normal to and between the edges 51 and 52. Each edge 51 is in substantial end-to-end alignment with the adjacent edge 41, while each edge 52 extends approximately from an end of the adjacent diagonal fold line 43. The panels 50 are each connected to the adjacent panel 40 by a fold line 56 extending generally normal to and between the edges 51 and 52. The fold line 54 thus extends from the juncture of adjacent aligned edges 51 and 41, to the juncture of the adjacent edge 52 and adjacent fold line 43. An extension or tab 54 may be provided on each panel 50, extending from its edge 51 proximate to its edge 53 and hingedly connected to the respective panel by a fold line 55 in alignment with the edge 51.

In FIG. 5 is shown a blank of a divider generally designated 60 which includes a generally rectangular main panel or sheet 61 bounded within a pair of generally parallel lower and upper edges 62 and 63, and a pair of generally parallel side folds or creases 64 extending normal to and substantially between the edges 62 and 63. A plurality of generally parallel cuts or slots 65 extend inward or upward from the edge 62, and suitable decorative and advertising matter may be imprinted on the panel. One or more generally U-shaped interrupted cuts 67 may be formed in the panel 61 and a fold line 68 may extend between the ends of the interrupted cut. Spaced within the interrupted cut 67 and fold line 68 may be provided a generally circular interrupted cut 69. Thus, the sheet portion within the cut 69 may be punched out or removed, and the sheet portion 70 within the cut 67 and fold 68 may be swung about the latter fold out of the plane of the panel 61, for purposes appearing presently.

Hingedly connected by the fold lines 64 to opposite sides of the panel 61 are a pair of wing panels 71 which may also be imprinted with any desired pictorial or advertising indicia. The wing panels 71 may optionally be generally rectangular and have their lower edges 72 extending obliquely upward and laterally inward toward the fold lines 64. A tab or extension 73 projects downward from the edge 72 of each wing panel 71. Also, an additional fold line 74 may be formed in each wing panel 71 extending closely along and parallel to the fold line 64. Each fold line 74 may be discontinuous, if desired, and at its discontinuous region provided with an interrupted cut 75 of any desired configuration, which may extend toward or beyond the adjacent fold line 64. Thus, each wing panel 71 is formed with a laterally inward extension 76 defined by the interrupted cut 75.

In order to achieve the assembled condition of FIG. 2, the liner 25 is folded along the several fold lines 44 and 54 into a generally rectangular formation, with the panel 26 defining a front wall, the panels 40 defining side walls, and the panels 50 combining to define a rear wall. The tabs 29 and 54 are swung about their respective fold lines to extend inward into the rectangular configuration, and the thus-folded liner is inserted snugly into the receptacle 20. In its inserted condition within the receptacle 20, the walls of the liner rest on the bottom wall 21 of the receptacle and extend upward therefrom beyond the receptacle walls, with the tabs 29 and 54 seating on the receptacle bottom wall.

The divider 60 may be folded along the folds 64 to swing the wing panels 71 generally normal to the main panel 61.

A generally rectangular bottom pad 80, see FIGS. 1 and 3, is then seated flat on the receptacle bottom wall overlying the inturned tabs 29 and 54 and sandwiching the latter between the pad and receptacle bottom wall. The bottom pad 80 is advantageously of a configuration substantially congruent to that of the internal configuration of the rectangularly folded liner 25 so as to be conformably received therein resting on the inturned liner tabs.

The divider 60, folded as described hereinbefore, is then assembled with a plurality of additional dividers 81 and 82, which may be conventional and therefore require no showing additional to that of FIG. 2, to provide a cellular structure which is conformably received within the receptacle 20 and liner 25 and serves to protectively separate the contained goods, such as bottles 83.

A downwardly opening cover or closure 84 may then be engaged over the filled receptacle 20 to protectively enclose the contents thereof. Any suitable sealing means, such as a tear tape, or the like, may be provided to secure the cover 84 in closed relation on the receptacle. In this condition, the assembly serves admirably well as a highly protective shipping container.

Upon reaching its point of ultimate sale, the container may be opened, first removing the cover or closure 84, the condition shown in FIG. 2. The front wall 26 of the liner 25 may then be folded along the fold lines 31 and 32 to locate the imprinted section 34 in front of the receptacle front wall 22 with its imprinted matter facing forward. The front wall section 35 may be inserted beneath the receptacle bottom wall to effectively retain the front liner wall in its folded condition. The tabs 36 and 38 may be folded rearward to afford the section 35 an appearance of thickness or depth. This condition is shown in FIG. 1.

Also, the sections 46 of the side walls 40 may be folded outward along their fold lines 43 and the portions within the cuts 47 punched upward for decorative or informative purposes. The divider 60 and the remaining dividers 81 and 82 may be removed from the receptacle, so that the bottled goods 83 are exposed to best advantage and presented in conjunction with the decorative and advertising matter carried by the liner sections 34 and 46. In addition, the divider 60 is manipulated to sever the interrupted cuts 75 and fold the wings 71 rearward along the fold lines 74, as well as to swing the portions 70 forward about their fold lines 68 and remove the portions within the cuts 69. In this condition, see FIG. 1, the forwardly swung portions 70 may be engaged over the necks of bottles 83; and the divider 61 is an upright elevated condition arranged with its wings 71 seated on the outwardly folded portions 46 having the tab 73 extending through the slots 48.

It will now be apparent that with very little effort the shipping container of FIG. 2 may be quickly and easily converted into a highly attractive and attention-arresting three-dimensional display, as in FIG. 1.

If desired, the divider wings 71 may optionally be swung rearward about their fold lines 64. Such a condition is shown in FIG. 6, wherein the divider wings 71a have been swung rearward relative to the main panel 61a, as may be desirable where the display is placed forward in a store window or the like. Also, the extensions 76 of FIGS. 1–5 have been eliminated, and the divider 60a provided with a cutout 76a.

In the embodiment of FIGS. 7–11, the receptacle 20b may be substantially identical to the receptacle 20 described hereinbefore, and a suitable cover (not shown) may also be identical to that of the first-described embodiment.

The liner 25b is quite similar to the liner 25 including a central or front panel 26b, a pair of intermediate or side panels 40b on opposite sides of the front panel, and distal or end panels 50b connected to the distal edges of the side panels. The liner 25b also includes lower edge extensions or anchoring tabs 29b and 54b corresponding to the anchoring tabs 29 and 54 of the first-described embodiment.

By way of difference, the side or intermediate panels 40b of the liner 25b are provided on their swingable upper sections 46b with a pair of flaps 86 extending inward toward each other, susperposed in edge-to-edge relation over the side regions of the central panel or front wall 26b. The flaps 86 are each connected to the adjacent upper section 46b of the respective side panel 40b by a generally vertical fold line 87 in alignment with the aligned fold lines 44b and 37b. Also, the upper section 46b of each side panel or wall 40b is formed with a diagonal fold line 88 extending from the lower end of fold line 87 upward and laterally outward or rearward to the upper panel edge 42b.

In assembly, the liner blank 25b is folded along the aligned fold lines 44b, 37b, and 87, and also along the fold lines 56b into generally rectangular configuration with the main panel 26b defining an upstanding front wall, the intermediate panels 40b defining upstanding side walls, and the end panels 50b combining to define an upstanding rear wall. In this condition, the liner is conformably inserted in the receptacle 20b. Of course, the anchoring tabs 29b and 54b are bent inward to seat flat on the bottom wall of the receptacle 20b.

A slightly modified divider 60b is shown in FIG. 11 as including a generally rectangular main panel or sheet 61b having formed therein a plurality of slots 65b extending upward from the lower panel edge 62b. A fold line 90 extends laterally inward from one side edge 64b of the divided panel 61b, passing one of the slots 65b and terminating in alignment with the next slot 65b. Interrupted cuts 91 may extend from the closed or inner end of each slot 65b to an adjacent point of the fold line 90. Thus, a generally rectangular region 92 of the divider panel 61b is defined within the panel edges 62b and 64b, the fold line 90b, and the panel slot 65b and its aligned cut 91 adjacent to the side edges 64b. A similar rectangular panel region 93 is defined within the panel edge 62b and fold line 90, and between an adjacent pair of slots 65b and aligned cuts 91. In the panel region 92 a pair of generally circular interrupted cuts 94 are formed, while a similar pair of circular interrupted cuts 95 are formed in the panel region 93.

A generally U-shaped interrupted cut 96 is formed in the divider panel 61b in alignment with and above the slot 65b between the panel regions 92 and 93. A laterally extending fold line 97 extends between the ends of the U-shaped interrupted cut 96; and, a generally circular interrupted cut 98 is formed in the panel region 99 bounded by the U-shaped cut 96 and fold line 97. An additional fold line 100 is formed in the divider panel 61b extending laterally between the panel side edges 64b.

In the shipping condition of FIG. 9, the divider 60b is associated with a plurality of conventional dividers 81b and 82b to define a cellular structure received conformably within the rectangularly folded liner 25b. This liner 60b is folded along the fold line 100 to lie flat over the upper ends of the contained bottle goods 83b. In this condition, a cover (not shown) is engaged over the illustrated assembly and sealed thereto for shipment.

At the point of ultimate sale, the cover is removed and the front liner wall 26b manipulated in the same manner as the liner wall 26 described hereinbefore. In addition, the side liner walls 40b are swung outward and downward about their diagonal fold lines 43b to locate the sections 46b each generally vertically in facing engagement with the adjacent side wall of the receptacle 20b. Further, the side-wall sections 46b are each swung or folded about their respective fold lines 88 and their extension flaps 86 engaged beneath the underside of the receptacle 20b and retained in position by the receptacle.

The assembled dividers 60b, 81b and 82b are removed, and the divider 60b folded along its fold line 90, and the portions within the cuts 94 and 95 punched out or removed. Thus, the panel regions 92 and 93 are swung forward and upward to extend generally normal to the remainder of the panel. Of course, the upper region of the panel 61b is swung about the fold line 100 into coplanar relation with the remainder of the panel. In this condition, the forwardly swung panel regions 92 and 93 are engaged over a plurality of bottle necks, the latter being received through the apertures now defined by the cuts 94 and 95 to provide a platform, as seen in FIG. 7. On the platform is superposed a bottle; and, the panel portion 99 is swung outward, and the cut 98 severed for receiving the neck of the platform-supported bottle. Thus, it is obvious that the regions 92 and 93, and the region 99 are swingable out of the plane of the remainder of the panel 61b for retaining engagement with the bottles to firmly support the panel 60b in elevated display condition. In this condition, theft of the engaged bottles is effectively resisted, while the remaining bottles are accessible for self-service.

Of course, the liner 25b and divider panel 60b may be decorated or imprinted in any desired manner to effect attractive display and sales of the goods.

Referring now to the embodiment of FIGS. 12–15, a receptacle is there generally designated 20c, and may be of generally rectangular configuration, including front, back, and side walls upstanding from a bottom wall.

A liner is generally designated 25c and may be generally similar to the previously described liners including a central panel 26c foldable forwardly over the top wall of the receptacle 20c, sections 46c swingable downward about respective fold lines 43c, flaps 86c swingable with respective sections 46c and engageable beneath opposite sides of the receptacle 20c. The liner 25c also includes a pair of rear wall panels 50c, best seen in FIG. 15.

Seated within the receptacle 20c are a quantity of packaged articles or goods 83c which are protectively separated from each other by a plurality of upstanding interengageable dividers or separators 81c and 82c. The separators 81c extend laterally, while the separators 82c extend forwardly and rearwardly, and intersect with the separators 81c. A generally horizontal cover panel or pad 130 rests on the upper edges of the dividers 81c and 82c, and may be provided with a plurality of through holes or perforations 131 receiving the upper ends of the articles 83c. The cover pad 130 may also be provided with one or more severable scores, such as the laterally extending severable score 132, for a reason appearing presently.

Resting on the upper ends of the articles 83c is a generally horizontal disposed support member, panel, or pad 133. An additional quantity of packaged articles or goods 134 rests on the support pad 133; and, the support pad may advantageously be formed in its upper surface with a plurality of upwardly facing recesses or sockets 135 each adapted to conformably receive the lower end of an article 134. The sockets 135 may be provided by any suitable construction, as by forming the support member 133 of two plies of cardboard, the upper ply having apertures therethrough and the lower ply closing the apertures to define thereof the recesses 135.

An additional group of upstanding dividers or separators 136 and 137 are arranged to extend between and protect the articles 134, the former separators extending laterally, while the latter separators extend forwardly and rearwardly for interfitting intersection between the laterally and forwardly and rearwardly extending separators.

Figure 12:
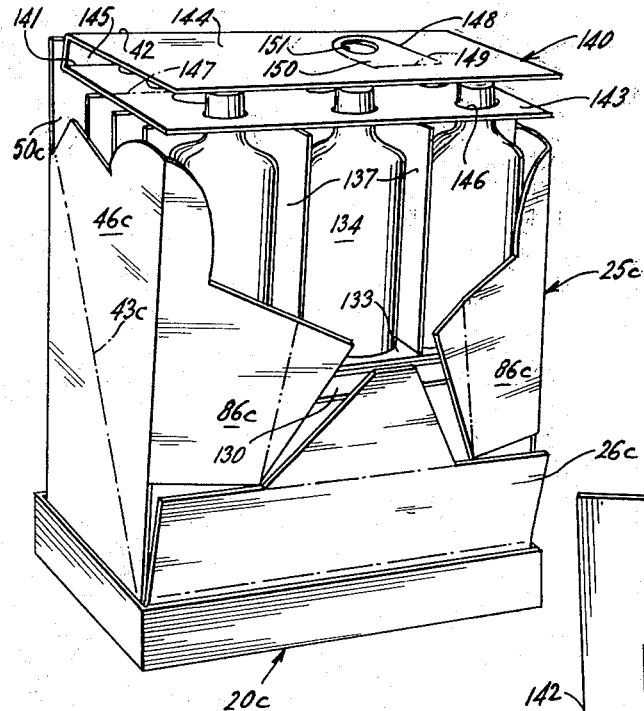
FIG. 12 is a top perspective view showing another slightly modified embodiment of the present invention in condition for shipping, except that the cover is removed for clarity of understanding.

As best seen in FIG. 12, a top member, generally designated 140, is disposed generally horizontally over the upper tier or group of articles 134. The top member 140 may be integrally fabricated of a single sheet of generally rectangular-shaped cardboard material, and is formed with a pair of closely adjacent, but spaced parallel folds or creases 141 and 142 extending laterally or transversely in the medial region between opposite ends of the integral sheet. Thus, the top member defines a generally horizontal lower panel 143, and a generally horizontal upper panel 144 superposed in spaced overlying relation with respect ot the lower panel, and a rear section 145 extending vertically between and combining with the creases 141 and 142 to hingedly connect together the lower and upper panels.

The lower panel 143 is provided with a plurality of through apertures or holes 146 and seats on the upper end edges of the dividers 136 and 137 with the upper ends of the articles 134 projecting upward through the apertures 146. Also, one or more severable scores may be formed in the lower panel 143, such as the laterally extending score 147. The upper panel 144 may be formed with a generally U-shaped cut 148 having a fold line or crease 149 extending between its ends to define a flap 150 swingable about the fold line out of the plane of the upper panel. The flap 150 is preferably formed with a through aperture 151 for a purpose appearing presently.

Figure 13:
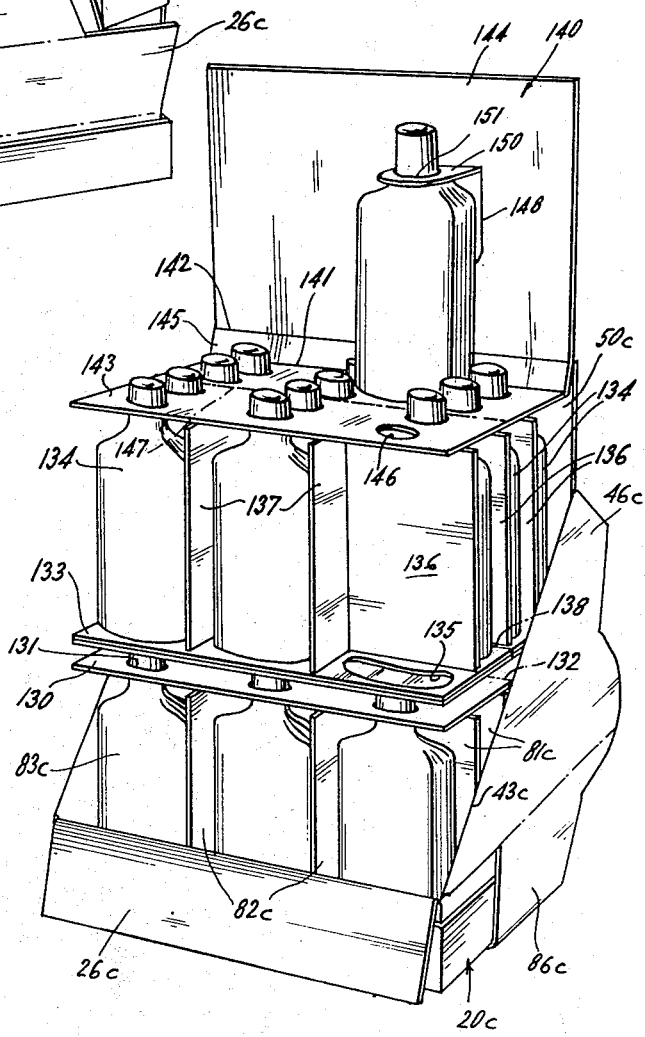
FIG. 13 is a top perspective view showing the embodiment of FIG. 12 in its initial sales-display condition.

In transforming the shipping and merchandising device from the shipping condition of FIG. 12 to the merchandising and sales-display condition of FIG. 13, it is only necessary to swing the upper panel 144 of the top member 140 upward to provide an upstanding rear display panel, as seen in FIG. 13. The flap 150 is swung forward and upward out of the plane of the upstanding display panel 144, and one of the articles 134 is removed from its shipping location and seated on top of the lower panel 143 with its upper end engaged through the aperture 151 of the flap 150. Also, the liner is folded and bent to expose the contained goods, in the manner described in connection with the preceding embodiments. Of course, the liner 25c, as well as the panel 144, and other parts of the device, as desired, may be provided with advertising indicia to attract and inform the purchasing public.

Figure 14:
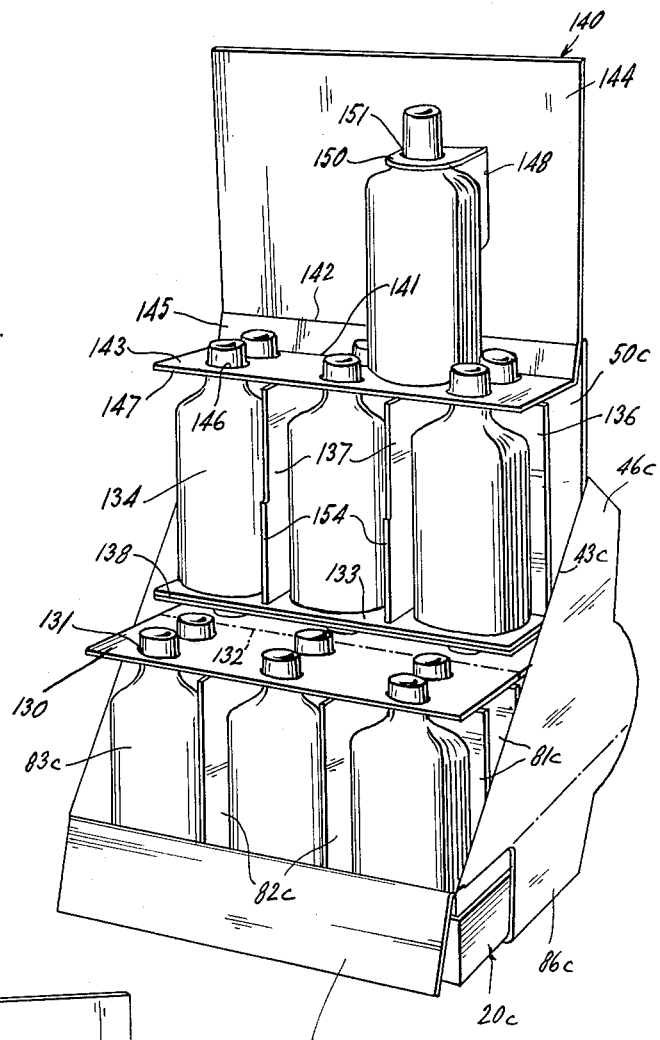
FIG. 14 is a front perspective view showing the structure of FIG. 13 in a later stage of its sales-display condition.

In the condition of FIG. 13, it will be observed that the goods are effectively displayed and easily accessible for removal and transfer to a purchaser, while effectively retained against pilferage and theft. Of course, the lower tier or group of articles 83c is retained by the receptacle 20c, liner 25c, dividers 82c and 81c, and the cover pad 130. Further, the upper tier or group of articles 134 is retained by the dividers 136 and 137, and is further retained having its lower ends seated in the sockets 135, and its upper ends received in the apertures 146 of the panel 143. Also, the removed uppermost article on top of the panel 143 is securely held by the flap 150. This effective prevention of theft continues even after partial removal of the contents. The normal order of removal of the contained goods would first be the forward rows of the upper group of articles 134. When one or more of these forward rows of articles 134 are removed, the dividers and portions thereof, as well as portions of the support member 133 and panel 143 may be removed to fully expose the remaining articles 134 in the upper group. Thus, as seen in FIG. 14, the two front rows of articles 134 have been removed, and the forward regions of the support member 133 and panel 143 have also been removed, as well as the forwardmost divider 136, and the forward portions of the dividers 137. That is, the forward portions of the dividers 137 have been severed along preformed severing lines or scores 154, see FIG. 14, while the panel 143 has been severed along its severance line or score 147, and the support member 133 severed along its severance line or score 138. The severance line or score 132 of the cover member 130 serves the same purpose upon removal of the forward articles 83c of the lower group. Of course, the severance lines may be located in different positions, and they may be greater or less in number, as desired.

Figure 15:
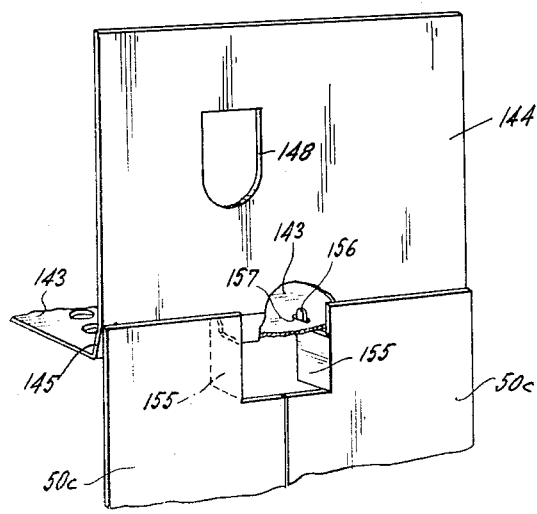
FIG. 15 is a partial rear perspective view of the embodiment of FIG. 14.

In FIG. 15 is shown a structure whereby the top member 140 is more firmly retained in position throughout display, even after removal of substantial goods. The rear panels 50c of the liner 25c are each formed with a generally vertically disposed flap 155 swung inward with its upper edge in supporting engagement with the undersurface of the lower top member panel 143. Further, each of the forwardly swung flaps 155 is formed on its upper edge with an upstanding tab 156 engaging through a slot 157 in the panel 143 to effectively prevent displacement of the top member.

Figure 16:
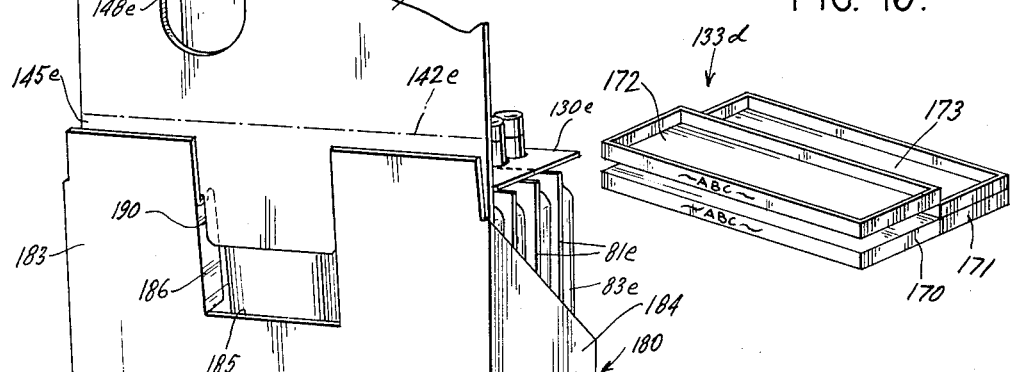
FIG. 16 is a perspective view showing an alternate form of supporting means as may be substituted in the embodiment of FIGS. 12–15.

In FIG. 16 is shown a further embodiment of support means 133d, adapted for use as an alternative to either or both of the support pad 133 and cover pad 130. The support means 133d may consist of a plurality of trays disposed generally horizontally, including a pair of generally coplanar lower trays 170 and 171, and a pair of upper trays 172 and 173. The lower trays 170 and 171 are adapted to be arranged in inverted relations, so as to define downwardly facing recesses, and the upper trays 172 and 173 are adapted to be seated, respectively, on the lower trays 170 and 171, but in upwardly facing relation. The forward tray 172 is shown elevated in FIG. 16 to illustrate the separate construction of the several trays, but in use would rest on the undertray 170, being substantially coplanar with upper rear tray 173. In this condition, the lower trays 170 and 171 would rest on and receive the upper end regions of the lower group of packages or bottles 83c, while the upper trays 172 and 173 would receive and support the lower end regions of the upper group of bottles or packages 134. Thus, the support means 133d will effectively deter pilferage and unauthorized removal of the bottled goods, without unduly obstructing the desired removal thereof, and permitting individual separation or removal of the trays 170, 171, 172, and 173, as the goods is removed, to insure maximum display of the goods throughout sale thereof. Of course, the trays of support means 133d may be suitably decorated to further enhance the advertising value of the entire display.

A very important embodiment is shown in FIGS. 17–20, wherein a receptacle is generally designated 20e, and may be of generally rectangular configuration, including front, back and side walls upstanding from a bottom wall.

Liner means is generally designated 25e and in this embodiment may include a pair of contiguous, forward and rearward, upwardly opening cases 180 and 181. That is, each liner case 180 and 181 includes a generally rectangular bottom wall, and upstanding front, side and rear walls. In particular, the forward liner case 180 includes a relatively low upstanding front wall 182, a relatively high upstanding rear wall 183, and a pair of upstanding side walls 184 of rearwardly increasing height. The rear wall 183 may be formed with a laterally medially located opening 185, see FIG. 18, which extends downward from the upper edge of the rear wall, and may be provided along side edges of the opening with forwardly or inwardly extending flaps 186.

Seated within the liner case 180 are a quantity of packaged articles or bottled goods 83e which are protectively separated from each other by a plurality of upstanding interengageable dividers or separators 81e and 82e. The separators 81e extend laterally, while the separators 82e extend forwardly and rearwardly, and intersect with the separators 81e. A generally horizontal cover panel, pad or platform member 130e rests on the upper edges of the dividers 81e and 82e and may be provided with a plurality of through holes or perforations 131e receiving the upper ends of articles 83e. The cover pad or platform member 130e may also be provided with one or more severable scores such as at 132 extending laterally between opposite edges of the platform member.

If desired, the cover panel or pad member 130e may rest directly on the bottles, as on the shoulders thereof; or, the pad member may rest on top of the bottles, say by having its apertures adapted to be punched out just prior to use rather than entirely preformed.

Resting on the upper ends of the articles 83e is a generally horizontally disposed pad or display panel 140e which has hinged at its rear edge by a fold line or crease 142e a generally vertically depending rear portion 145e. The rear portion 145e depends in close facing engagement with the forward side of the rear case wall 183, and is formed with slots 190 for interfitting engagement with the rear wall flaps 186.

The panel or top pad 140e may be formed with a generally U-shaped cut 148e having a fold line or crease 149e extending between its ends to define a flap 150e. The flap 150e is swingable about the fold line out of the plane of the panel 140e and is preferably formed with a through aperture 151e.

Figure 17:
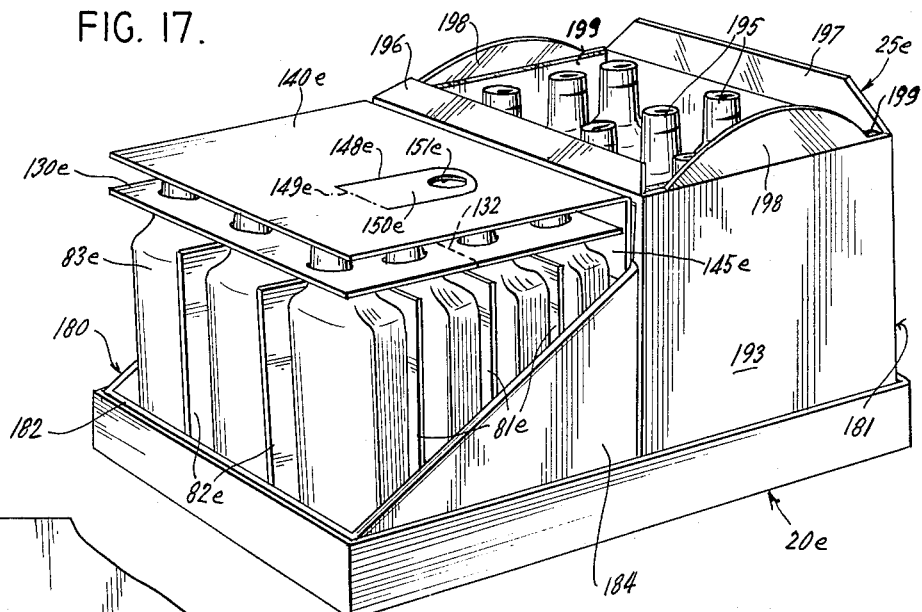
FIG. 17 is a top perspective view showng another embodiment of the instant invention in its shipping condition, except that the cover and certain separators have been removed.

The liner case 181 may also include a generally rectangular bottom wall, and upstanding therefrom a front wall 192, side walls 193 and a rear wall 194. The upstanding front, side and rear walls may all be of substantially the same height, approximating that of the contained bottled goods 195. Along the upper edges of the front and rear walls 192 and 194 may be flaps 196 and 197, respectively, while flaps 198 may be provided on the upper edges of the side walls 193. As shown in FIG. 17, the liner case 181 is without upstanding internal separators and dividers, such as 82e and 81e on the liner case 180. However, in shipment, such separators and dividers are provided, which separators and dividers are preferably removed at the location of ultimate sale. In addition, the rear liner case 180 may be provided interiorly thereof with a pair of generally rectangular upstanding free panels or side pads 199 each in facing engagement with a respective side wall of the rear liner case.

As seen in FIG. 20, the front wall 192 of the liner case 181 is cut and scored along a generally trapezoidal configuration at 200. By this scored configuration, the front wall 192 is formed to define a display panel 201, having hinged thereto along the lower and upper sides thereof an anchor flap 202 and a retaining flap 203, respectively. That is, the anchor flap 202 is hinged along the lower edge of the display panel 201 by a fold line 204, while the retaining flap 203 is hinged to the upper edge of the display panel 201 by a pair of parallel fold lines 205. A finger opening 207 may be provided in the anchor flap 202 to facilitate removal of the display panel 201 and its hinged flaps 202 and 203 from the front case wall 192. It will be noted that the anchor flap 202 may taper in the direction away from the hinged connection 204, while the display panel 201 and its retaining flap 203 are of gradually increasing lateral extent in the upward direction away from the fold line 204. Also, a pair of laterally inwardly extending notches or cutouts 206 may be formed in general alignment with the fold lines 205 and extending inward from opposite sides of the retaining panel or flap 203. Upon removal of the display panel 201 and its hingedly connected flaps 202 and 203 from the case wall 192, an opening 208 is left in the wall, see FIG. 19. The opening 208 is of a generally trapezoidal configuration having downwardly convergent side edges. The retaining flap 203 may be engaged interiorly of the liner case 193 through the front case wall with the notches 206 respectively receiving the convergent side edges of the front wall opening 208. As seen in FIG. 19, the display panel 201 may extend forward and downward in front of the case 181, and the anchor flap 202 may extend rearward for retention beneath the liner case.

Figure 18:
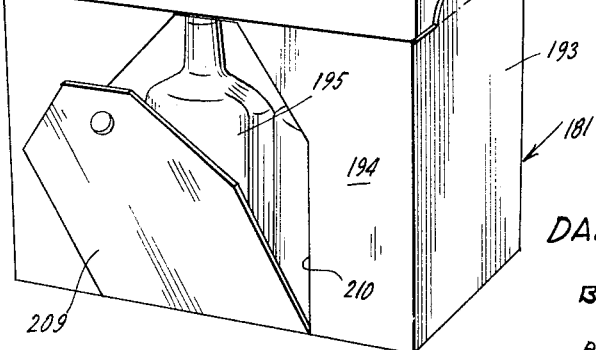
FIG. 18 is a rear perspective view showing the embodiment of FIG. 17 in its display condition.

The rear wall of the liner case 181 may also be provided with suitable lines of weakening for convenient severance, see FIG. 18, to define a panel 209. The panel 209 is swingable out of the plane of the rear case wall 194 to provide an opening 210 affording manual access to the interior of the case 181 for convenient removal of the goods 195.

In assembly, it is only necessary to superpose the case 180 upon the case 181, the upper edge flaps 196 and 197 preferably being folded inward to facilitate support of the upper case, and the flaps 198 extending upward along opposite sides of the case 180 and retain the latter against lateral movement and seated on the upper edges of panels 199. The display panel 140e may be swung upward about its hinged connection 142e, and the flap 150e swung forward out of the plane of the display panel. One of the bottles may be removed from either the group 83e or 195 and seated upright on the support panel 130e with its neck engaged through the flap opening 151e, such as at 212 in FIG. 19. This, of course, serves to maintain the display panel 140e upright, while attractively displaying the bottle 212 in conjunction with the display matter of the panel, and at the same time retaining the bottle in theftproof condition.

When individual bottles of the goods are sold, they may be conveniently retrieved through the rear access opening 210 in the lower liner case 181, which opening is effectively concealed from the public view. Of course, the upper tier of bottles 83e, carried in the upper liner case 184, are retained in theftproof condition by cooperating action between the liner case itself and the panel or support member 130e engaged over the upper ends of the bottles. Also, the bottles 195 exposed through the front wall opening 208 of the lower liner case 181 are effectively held against pilfering by the bounding edges of the front wall opening.

Thus, it is now seen that the construction of FIGS. 17–20 may be almost instantly set up as a pleasing, attractive and highly efficient selling display. For example, an outer shipping container or case may be of any conventional type, say the zip-open construction, and upon mere opening of the outer container the contents thereof are substantially completely in condition for display use. No cutting, trimming or tedious following of instructions is required. In practice, even with unskilled personnel, complete set-up may be accomplished in approximately thirty seconds, for substantial savings in time and labor. Also, there is substantially no waste of materials to achieve economy in manufacture, and elimination of the heretofore necessary cleaning-up operation subsequent to erection of a display.

Another highly advantageous and unique feature of the instant embodiment is the great versatility in use, so as to be desirable by all merchants in all different kinds of retail merchandising operations. In addition to the stacked set-up of FIG. 19, a merchant may, if space is limited or for other reasons, employ only a single liner case, say the upper liner case 180 without the lower liner case 181.

Even in this condition, the appearance is one of a full and complete display. Also, the pad 130e may be severed along score line 132 and removed to convert the liner case 180 to a self-service display. Or, the pad 130e may remain as illustrated to provide a complete theftproof display.

In the condition of FIG. 19, the display may be employed permanently, stock being sold from the rear of lower case liner 181, and replenished as required. In this condition, the display will always appear completely full.

From the foregoing it will be understood that the present invention provides a unique shipping and merchandising method and structure which fully accomplish their intended objects and are well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. A merchandising and shipping device comprising a polygonal receptacle having a bottom wall and rear, front and side walls and receiving packaged goods supported on said bottom wall, said rear, front and side walls surrounding said goods with the top edges of said rear, front and side walls considerably below the top level of said packaged goods, a liner in said receptacle supported on said bottom wall and extending against and about the interior of said rear, front and side walls and surrounding said goods, said liner extending upward considerably above said side and front walls and to near the top level of said goods, and a cover removably engaged over said receptacle and liner and closing said receptacle for shipping, said liner being cut downwardly from its upper edge to points vertically aligned with the side corners of said receptacle and thereby defining liner flaps coextensive in width with the sides and front of said receptacle, said liner flaps being scored along the entire width above said side and front wall top edges, the portions of said liner flaps above said score liner being foldable outwardly on their score lines, upon removal of said cover, to expose the sides of said goods in situ for merchandising.

2. A merchandising and shipping device according to claim 1, the portions of said liner flaps above said score lines carrying display matter on their inner faces, said display matter being positioned to be exposed outwardly upon folding of said portions of said liner flaps above said score lines outwardly to expose the sides of said goods.

3. A merchandising and shipping device according to claim 1, at least one of said portions of said liner flaps above said score lines having a further score line horizontally disposed in the out folded position of said liner flap portion to define a liner flap panel between said score lines and a flap beyond the second mentioned score line, said liner flap panel of greater height than the distance between the first mentioned score line and the bottom of said receptacle, said panel in display condition extending from the first mentioned score line to the level of the bottom of said receptacle, said flap being adapted to be folded on its score line to extend from said panel toward said receptacle and being of sufficient length to extend under the bottom of said receptacle when said panel is in display position, said flap being thereby adapted to be frictionally held between the bottom of said receptacle and a support upon which said receptacle is placed so as to maintain said panel in display position.

4. A merchandising and shipping device according to claim 3, said panel carrying display matter on its inner face so that said display matter is exposed to outside view when said panel is folded to its display condition.

5. A merchandising and shipping device according to claim 1, in combination with a divider removably interposed in said receptacle for separating the goods, and a tab hinged to said divider and swingable therefrom and engageable with the goods for positioning of said divider in elevated display condition above said receptacle.

6. A merchandising and shipping device according to claim 1, said device also comprising a pair of generally parallel top panels, means hingedly connecting said top panels along resepctive edges thereof, the lowermost of said top panels having means for releasably receiving the tops of said goods for theftproof attention thereof, the uppermost of said top panels being adapted to overlie said goods so as to be able to support additional goods thereon, the lowermost of said top member panels having slots, said liner having tabs hingedly connected thereto and engageable through said slots to retain the lowermost of the top member panels in position.

7. A merchandising and shipping device according to claim 1, said device also comprising a group of upstanding dividers interposed and separating the goods, said dividers being scored for severance and partial removal as goods are removed.

8. A theftproof package for shipping and displaying bottled goods, said package comprising a receptacle, a pair of liner cases of the same cross section snugly and removably received within said receptacle, a first liner case having a bottom wall and side walls, selected side walls being of height substantially less than bottle height to expose the bottles for display, the second liner case having a bottom wall, side walls extending above the bottles therein, an open top and means within said second liner case for releasably supporting said first liner case clearingly above the bottles in said second liner case with said liner cases in vertical registration and with said first liner case closing the top of said second liner case, the side wall of said second liner case having a first opening of size smaller than bottle size to expose the bottles in said second liner case for display, the orientation of said second liner case first opening relative to said first liner case, selected walls being such as to permit a viewer to see the bottles of both liner cases from the same position, said second liner case side wall having second opening of size greater than bottle size and shaped and oriented to permit withdrawal therethrough of a generally vertical bottle and positioned to be concealed from view by a viewer positioned to look through said second liner case first opening.

9. A package according to claim 8, said package also comprising a flap hingedly connected to the side wall of said second liner case along an edge of the first opening therein, said flap being foldable outwardly from said side wall for display purposes.

10. A merchandising and shipping device according to claim 8, said means within said second liner case for releasably supporting said first liner case comprising liner panels against opposite side walls of said second liner case and extending to the upper edge thereof.

11. A package in accordance with claim 10, said means within said second liner case for releasably supporting said first liner case also comprising support flaps hinged to the upper edges of respective side walls of said second liner case other than the walls against which said support panels are located and foldable to position to underline and abut the bottom of the first liner case, and further flaps hingedly connected to the top edges of the side walls of said second liner case against which said support panels are located and foldable to position against the outer faces of the sides of said first liner case.

12. A package in accordance with claim 7, said package also comprising a generally horizontal platform having means for releasably receiving the upper regions of the packaged goods in said first liner case to effectively theftproof the contents of said first liner case without obscuring the same.

(References on following page)

References Cited in the file of this patent

UNITED STATES PATENTS

| | | |
|---|---|---|
| 588,245 | Sachs | Aug. 17, 1897 |
| 1,551,139 | Dietsche | Aug. 25, 1925 |
| 1,906,647 | Smith et al. | May 2, 1933 |
| 1,911,995 | Gaffney | May 30, 1933 |
| 1,949,987 | Archer | Mar. 6, 1934 |
| 2,021,003 | Einson et al. | Nov. 12, 1935 |
| 2,084,635 | Friedrich et al. | June 22, 1937 |
| 2,107,999 | Friedel | Feb. 8, 1938 |
| 2,110,934 | Kanty | Mar. 15, 1938 |
| 2,126,461 | Graham | Aug. 9, 1938 |
| 2,178,091 | Weiss | Oct. 31, 1939 |
| 2,225,822 | Crook | Dec. 24, 1940 |
| 2,298,136 | Lavere | Oct. 6, 1942 |
| 2,339,176 | Lee | Jan. 11, 1944 |
| 2,350,163 | Guyer | May 30, 1944 |
| 2,725,978 | Calabrese | Dec. 6, 1955 |
| 2,727,677 | Zastrow | Dec. 20, 1955 |
| 2,745,543 | Broderick | May 15, 1956 |
| 2,833,397 | Boeye et al. | May 6, 1958 |
| 2,840,293 | Prige | June 24, 1958 |
| 2,990,056 | Gillam | June 27, 1961 |